(12) United States Patent
McAfee et al.

(10) Patent No.: US 9,868,844 B2
(45) Date of Patent: Jan. 16, 2018

(54) MATERIALS AND METHODS FOR ENHANCING PHYSICAL PROPERTIES, DYNAMIC PROPERTIES AND DISPERSION IN CARBON BLACK AND MIXTURES CONTAINING CARBON BLACK

(71) Applicant: CR MINERALS COMPANY, LLC, Ohkay Owingeh, NM (US)

(72) Inventors: Carl McAfee, Kennedale, TX (US); Jeffrey Alexander Whidden, Brentwood, MO (US); Michael Lee Dulisse, Graford, TX (US)

(73) Assignee: CR Minerals Company LLC, Ohkay Owingeh, NM (US)

( * ) Notice: Subject to any disclaimer, the term of this patent is extended or adjusted under 35 U.S.C. 154(b) by 0 days.

(21) Appl. No.: 15/098,982

(22) Filed: Apr. 14, 2016

(65) Prior Publication Data

US 2016/0304697 A1    Oct. 20, 2016

Related U.S. Application Data

(60) Provisional application No. 62/148,419, filed on Apr. 16, 2015.

(51) Int. Cl.
  *C08K 3/36* (2006.01)
  *C08K 3/04* (2006.01)
  *C08K 3/34* (2006.01)

(52) U.S. Cl.
  CPC .......... *C08K 3/36* (2013.01); *C08K 3/04* (2013.01); *C08K 3/346* (2013.01); *C08K 2201/005* (2013.01)

(58) Field of Classification Search
  CPC ............ C08K 3/36; C08K 3/346; C08K 3/04
  See application file for complete search history.

(56) References Cited

U.S. PATENT DOCUMENTS

| 4,598,105 | A | | 7/1986 | Weber et al. | |
|---|---|---|---|---|---|
| 5,094,829 | A | * | 3/1992 | Krivak | B82Y 30/00 423/335 |
| 5,227,425 | A | | 7/1993 | Rauline | |
| 5,891,949 | A | * | 4/1999 | Evans | C01B 33/193 524/492 |
| 7,625,971 | B2 | | 12/2009 | Tokunaga et al. | |
| 2004/0143050 | A1 | * | 7/2004 | Gatti | C08K 3/08 524/420 |
| 2004/0242750 | A1 | * | 12/2004 | Hirayama | B60C 1/00 524/442 |

FOREIGN PATENT DOCUMENTS

DE    102008009326    8/2009

OTHER PUBLICATIONS

Panday, G. et al., *Carbon nanotube-based multifunctional polymer nanocomposites*, Polymer Reviews 2012, vol. 52; pp. 355-416.
Santos Silva et al., *Rheological and mechanical characterization of poly (methyl methacrylate)/silica (PMMA/SiO2) composites*, Materials Research 2014, vol. 17, No. 4, pp. 926-932.
Written Opinion and International Search Report for International Application No. PCT/US16/27540 dated Jul. 15, 2016.

* cited by examiner

*Primary Examiner* — Robert Harlan
(74) *Attorney, Agent, or Firm* — Altera Law Group, LLC (57) ABSTRACT

The present invention provides materials and methods to enhance dispersion of carbon black within polymer systems, improving both static physical properties and dynamic physical properties of polymers (such as natural or synthetic rubber) containing carbon black. Some variations provide a composition containing a polymer, carbon black, and a performance-enhancing additive comprising amorphous silica, wherein the performance-enhancing additive causes a property improvement associated with or imparted by the carbon black. The performance-enhancing additive scrubs or exfoliates the carbon black in situ, to improve tensile strength, modulus, tear, elongation, dispersion, flow properties, viscosity, hardness, specific gravity, rebound, torque, and/or load of the polymer composite.

14 Claims, 8 Drawing Sheets

MATERIALS AND METHODS FOR ENHANCING PHYSICAL PROPERTIES, DYNAMIC PROPERTIES AND DISPERSION IN CARBON BLACK AND MIXTURES CONTAINING CARBON BLACK

PRIORITY DATA

This patent application is a non-provisional patent application claiming priority to U.S. Provisional Patent App. No. 62/148,419, filed Apr. 16, 2015, which is hereby incorporated by reference herein.

FIELD OF THE DISCLOSURE

The present invention relates to polymers containing carbon black, and methods of enhancing polymer properties with performance-enhancing additives.

BACKGROUND OF THE DISCLOSURE

The dispersion of carbon black as a reinforcing filler in elastomer formulations is well-known for being highly influential in achieving optimal physical properties in rubber compounds. Methods to ensure the adequate dispersion of this critical ingredient include various chemical and physical approaches. The ongoing challenge for rubber compounders, mixers and processors is to adequately mix and distribute the reinforcing ingredient in a timely and efficient manner to achieve the maximum physical properties in the minimum amount of mixing time.

Early approaches used various soaps and waxes to wet out the reinforcing material and provide something for the polymer to grab onto during the initial stages of the rubber mixing process (see Takino et al., "Effect of Processing Additives on Carbon Black Dispersion and Grip Property of High Performance Tire Tread Compound," *Rubber Chemistry & Technology*, March 1997, Vol. 70, No. 1, pp. 15-24). Optimal use levels were approximately 1 phr (parts per hundred rubber).

Recent approaches have used silane and coupling-agent chemistry for coating the various reinforcing fillers with a layer that has one end like the filler and the other end like the polymer. This has been particularly useful for silica-based reinforcements and to a lesser degree with carbon black reinforcements. Optimal use levels were approximately 2-3 phr.

In the years 1999-2001, attempts were made to pursue dual-phase filler systems using both carbon black and precipitated silicas. A series of papers were written about this approach. See, for example, Wang et al., "New Generation Carbon Silica Dual Phase Filler Part I. Characterization and Application to Passenger Tire," *Rubber Chemistry & Technology*, May 2002, Vol. 75, No. 2, pp. 247-263; and Wang et al., "Carbon-Silica Dual Phase Filler, a New Generation Reinforcing Agent for Rubber: Part IX. Application to Truck Tire Tread Compound," *Rubber Chemistry & Technology*, March 2001, Vol. 74, No. 1, pp. 124-127. Much discussion arose over the mechanisms of dispersion and the role and effectiveness of each of the reinforcing phases. The optimal use levels were in the 10-100 phr range.

In more recent years, examples of small amounts of dissimilar materials have been considered. Efforts were made with talc as a potential dispersion aid as recent as 2012 (Hershberger, "Effect of Talc on Carbon Black Dispersion," *Rubber World*, February 2012). Additionally, as recent as 2014, efforts were underway to evaluate the synergistic effect of carbon black and the dual-phase filler system mentioned in the preceding paragraph (Xiong et al., "Synergistic Effect of Carbon Black and Carbon-Silica Dual Phase Filler in Natural Rubber Matrix", *Polymer Composites*, August 2014, Vol. 35, Issue 8, pp. 1466-1472).

Improvements are still desired commercially to enhance dispersion of carbon black within polymer systems, as well as to improve static and dynamic physical properties of polymers (such as, but not limited to, natural or synthetic rubber) containing carbon black.

SUMMARY OF THE DISCLOSURE

Some variations of the invention provide a composition containing a polymer, carbon black, and a performance-enhancing additive comprising amorphous silica, wherein the performance-enhancing additive causes a property improvement associated with or imparted by the carbon black, compared to an otherwise-identical composition that does not contain the performance-enhancing additive.

It is believed that the performance-enhancing additive scrubs or exfoliates the carbon black in situ. The improved property may be selected from static physical properties, dynamic physical properties, dispersion, and combinations thereof. For example, the improved property may be tensile strength, modulus, tear, elongation, dispersion, flow properties, viscosity, hardness, specific gravity, rebound, torque, load, or combinations thereof.

In some embodiments, the amorphous silica is present in the composition at a concentration from about 0.1 wt % to about 10 wt %, such as from about 0.5 wt % to about 5 wt %.

The performance-enhancing additive, or the amorphous silica contained in the performance-enhancing additive, may be derived from a material selected from the group consisting of pumice, perlite, another natural volcanic material with a similar morphology to pumice or perlite, and combinations thereof.

The performance-enhancing additive, or the amorphous silica contained in the performance-enhancing additive, may be derived from an irregularly shaped, porous material, such as a synthetic ceramic material that is irregularly shaped and porous.

In some embodiments, the amorphous silica is present as finely ground pumice. In certain embodiments, the performance-enhancing additive consists essentially of the finely ground pumice.

The performance-enhancing additive may be characterized by an average particle size selected from about 1 micron to about 10 microns, such as from about 3 microns to about 7 microns. In some embodiments, the performance-enhancing additive contains less than 1 wt % of particles that are less than 1 micron in particle size. In other embodiments, the performance-enhancing additive contains more than 1 wt % of particles that are less than 1 micron in particle size.

The performance-enhancing additive optionally further contains one or more materials selected from the group consisting of kaolin, talc, and mica. In such performance-enhancing additives, the amorphous silica is typically present from about 50 wt % to about 99 wt % of the performance-enhancing additive.

The polymer within the composition may be a natural or synthetic rubber, for example, or any other polymer or modified polymer suitable for combining with carbon black, along with the performance-enhancing additive.

Variations of the invention also provide a method of enhancing physical properties, dynamic properties, and/or dispersion in a material containing a polymer and carbon black, the method comprising mixing a performance-enhancing additive comprising amorphous silica into the material, wherein the performance-enhancing additive causes a property improvement associated with or imparted by the carbon black, compared to an otherwise-identical composition that does not contain the performance-enhancing additive, wherein the property is selected from static physical properties, dynamic physical properties, dispersion, and combinations thereof.

The performance-enhancing additive scrubs or exfoliates the carbon black in situ, in some embodiments. The improved property may be selected from the group consisting of tensile strength, modulus, tear, elongation, dispersion, flow properties, viscosity, hardness, specific gravity, rebound, torque, load, and combinations thereof.

In certain methods, the amorphous silica is present as finely ground pumice. The performance-enhancing additive may be characterized by an average particle size selected from about 1 micron to about 10 microns.

The polymer within the material may be a natural or synthetic rubber, for example, or any other polymer or modified polymer suitable for combining with carbon black, along with the performance-enhancing additive.

In some methods, the performance-enhancing additive is added to the carbon black prior to dispersion of a mixture of the carbon black and the performance-enhancing additive into the polymer. In these or other embodiments, the performance-enhancing additive is added directly to the polymer, separately from dispersion of the carbon black into the polymer. For example, the carbon black may be added to the polymer, and then the performance-enhancing additive is added to the polymer. Alternatively, or additionally, the performance-enhancing additive may be added to the polymer, and then the carbon black is added to the polymer.

DETAILED DESCRIPTION OF SOME EMBODIMENTS

Unless otherwise indicated, all numbers expressing reaction conditions, concentrations, yields, and so forth used in the specification and claims are to be understood as being modified in all instances by the term "about." Accordingly, unless indicated to the contrary, the numerical parameters set forth in the following specification and attached claims are approximations that may vary depending at least upon the specific analytical technique. Any numerical value inherently contains certain errors necessarily resulting from the standard deviation found in its respective testing measurements.

As used in this specification and the appended claims, the singular forms "a," "an," and "the" include plural referents unless the context clearly indicates otherwise. Unless defined otherwise, all technical and scientific terms used herein have the same meaning as is commonly understood by one of ordinary skill in the art to which this disclosure belongs. If a definition set forth in this section is contrary to or otherwise inconsistent with a definition set forth in patents, published patent applications, and other publications that are incorporated by reference, the definition set forth in this specification prevails over the definition that is incorporated herein by reference.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phase "consisting essentially of" limits the scope of a claim to the specified elements or method steps, plus those that do not materially affect the basis and novel characteristic(s) of the claimed subject matter.

With respect to the terms "comprising," "consisting of," and "consisting essentially of," where one of these three terms is used herein, the presently disclosed and claimed subject matter may include the use of either of the other two terms. Thus in some embodiments not otherwise explicitly recited, any instance of "comprising" may be replaced by "consisting of" or, alternatively, by "consisting essentially of."

This disclosure is predicated on the surprising discovery of an increase in properties, such as (but not limited to) tensile strength, of carbon black caused by the addition of a pumice material.

Testing has shown that a pumice material added to carbon black increases various static and dynamic physical properties and dispersion. It is believed, without being limited by theory, that the addition of the pumice material helps to scrub or exfoliate the carbon chains of the carbon black, leading to enhanced final properties.

Pumice, called pumicite in its powdered or dust form, is a volcanic rock that consists of highly vesicular rough textured volcanic glass, which may or may not contain crystals. Pumice is composed of highly microvesicular glass pyroclastic with very thin, translucent bubble walls of extrusive igneous rock. It is commonly, but not exclusively, of silicic or felsic to intermediate in composition (e.g., rhyolitic, dacitic, andesite, pantellerite, phonolite, trachyte). Pumice forms when volcanic gases exsolving from viscous magma nucleate bubbles which cannot readily decouple from the viscous magma prior to chilling to glass.

Carbon black is a widely used material around the world serving many functions. One of the more widespread uses is that of a reinforcing filler in rubber (such as in tires for example) and other materials. In these types of applications, carbon black imparts tensile strength as well as abrasion resistance. "Carbon black" should be construed broadly to mean any similar types of carbon or carbon-containing materials, derived from any carbon-containing feedstock.

Carbon forms that may be suitable as carbon black include, for example, acetylene black, furnace black, Ketjen black, channel black, lamp black, thermal black, asphalt pitch, coal tar, active carbon, mesophase pitch, and polyacetylenes, natural graphites, flaky graphite, plate-like graphite; high-temperature sintered carbon products obtained, for example, from petroleum coke, coal coke, celluloses, saccharides, and mesophase pitch; artificial graphites, including pyrolytic graphite; carbon nanostructures such as carbon nanotubes; or graphene-based carbon structures.

In some embodiments, carbon black can be broadly defined as very fine particulate aggregates of carbon possessing an amorphous quasi-graphitic molecular structure. Exemplary carbon blacks are thermal blacks and furnace blacks. The most significant areas of distinction between a thermal black and a furnace black are particle size and structure. Most carbon blacks are classified and assigned a grade number based on surface area and structure measurements. For example, Carbon Black N762, which is a typical, commercially available furnace carbon black, has a mean diameter of about 80 nm and surface area of about 25 $m^2/g$. Furnace blacks do not consist of individual spheres of carbon but exhibit a rather wide range of particle aggregations in which carbon particles are fused into grape-like clusters and/or reticulate chains or branches.

Some variations of the invention provide a composition containing a polymer, carbon black, and a performance-enhancing additive comprising amorphous silica, wherein the performance-enhancing additive causes a property improvement associated with or imparted by the carbon black, compared to an otherwise-identical composition that does not contain the performance-enhancing additive.

It is believed that the performance-enhancing additive scrubs or exfoliates the carbon black in situ. The improved property may be selected from static physical properties, dynamic physical properties, dispersion, and combinations thereof. For example, the improved property may be tensile strength, modulus, tear, elongation, dispersion, flow properties, viscosity, hardness, specific gravity, rebound, torque, load, or combinations thereof.

In various embodiments, the amorphous silica is present in the composition at a concentration from about 0.01 wt % to about 20 wt %. In some embodiments, the amorphous silica is present in the composition at a concentration from about 0.1 wt % to about 10 wt %, such as about 0.5 wt %, 1.0 wt %, 1.5 wt %, 2.0 wt %, 2.5 wt %, 3.0 wt %, 3.5 wt %, 4.0 wt %, 4.5 wt %, or 5 wt %.

The performance-enhancing additive, or the amorphous silica contained in the performance-enhancing additive, may be derived from a material selected from the group consisting of pumice, perlite, another natural volcanic material with a similar morphology to pumice or perlite, and combinations thereof.

The performance-enhancing additive, or the amorphous silica contained in the performance-enhancing additive, may be derived from an irregularly shaped, porous material, such as a synthetic ceramic material that is irregularly shaped and porous. Porous ceramics may be highly reticulated ceramic materials with a wide range of structures, such as foams, honeycombs, interconnected rods, fibers, or hollow spheres. Ceramics may be based on clays (such as kaolinite, montmorillonite-smectite, illite, or chlorite clays), oxides (such as alumina, beryllia, ceria, or zirconia), or nonoxides (such as carbide, boride, nitride, or silicide).

To derive the performance-enhancing additive, or the amorphous silica to be used in the performance-enhancing additive, various thermal, chemical, or physical approaches may be used. For example, grinding or milling may be utilized to form a finely ground powder from pumice, perlite, or a ceramic material. Alternatively, or additionally, thermal or chemical reactions may be utilized to reduce particle size or to alter the particle shape or porosity.

In some embodiments, the amorphous silica is present as finely ground pumice. In certain embodiments, the performance-enhancing additive consists essentially of the finely ground pumice. By "consists essentially of" here, it is meant that the performance-enhancing additive is basically finely ground pumice, recognizing that there may be present certain impurities (e.g., dust or dirt) that do not significantly affect the ability of the ground pumice to cause a property improvement associated with or imparted by the carbon black.

The performance-enhancing additive may be characterized by an average particle size selected from about 1 micron to about 10 microns, such as about 1, 2, 3, 4, 5, 6, 7, 8, 9, or 10 microns. The performance-enhancing additive may be characterized by an average particle size that is less than 1 micron. In other embodiments, the performance-enhancing additive is characterized by an average particle size that is less greater than 10 microns.

In some embodiments, the performance-enhancing additive contains less than 10 wt %, 5 wt %, or 1 wt % of particles that are less than 1 micron in particle size. In some embodiments, the performance-enhancing additive contains less than 10 wt %, 5 wt %, or 1 wt % of particles that are less than 3 microns in particle size. In some embodiments, the performance-enhancing additive contains less than 10 wt %, 5 wt %, or 1 wt % of particles that are less than 7 microns in particle size.

In some embodiments, the performance-enhancing additive contains more than 1 wt %, 5 wt %, or 10 wt % of particles that are less than 1 micron in particle size. In some embodiments, the performance-enhancing additive contains less than 10 wt %, 5 wt %, or 1 wt % of particles that are greater than 3 microns in particle size. In some embodiments, the performance-enhancing additive contains less than 10 wt %, 5 wt %, or 1 wt % of particles that are greater than 7 microns in particle size.

The performance-enhancing additive optionally further contains one or more materials selected from the group consisting of kaolin, talc, and mica. In such performance-enhancing additives, the amorphous silica is present from about 0.1 wt % to about 99.9 wt % of the performance-enhancing additive, typically from about 50 wt % to about 99 wt % of the performance-enhancing additive.

The polymer within the composition may be a natural or synthetic rubber, for example, or any other polymer (or modified polymer, or polymer blend) suitable for combining with carbon black, along with the performance-enhancing additive.

Variations of the invention also provide a method of enhancing physical properties, dynamic properties, and/or dispersion in a material containing a polymer and carbon black, the method comprising mixing a performance-enhancing additive comprising amorphous silica into the material, wherein the performance-enhancing additive causes a property improvement associated with or imparted by the carbon black, compared to an otherwise-identical composition that does not contain the performance-enhancing additive, wherein the property is selected from static physical properties, dynamic physical properties, dispersion, and combinations thereof.

The performance-enhancing additive scrubs or exfoliates the carbon black in situ, in some embodiments. The improved property may be selected from the group consisting of tensile strength, modulus, tear, elongation, dispersion, flow properties, viscosity, hardness, specific gravity, rebound, torque, load, and combinations thereof.

In some embodiments, the performance-enhancing additive increases tensile strength of the polymer/carbon black/additive material by about 1%, 2%, 3%, 4%, 5%, 6%, 7%, 8%, 9%, 10%, or more, compared to a polymer/carbon black material that is otherwise identical but does not contain the performance-enhancing additive.

In some embodiments, the performance-enhancing additive increases 100% elongation modulus of the polymer/carbon black/additive material by about 1%, 2%, 3%, 4%, 5%, 6%, 7%, 8%, 9%, 10%, or more, compared to a polymer/carbon black material that is otherwise identical but does not contain the performance-enhancing additive.

In some embodiments, the performance-enhancing additive increases 200% elongation modulus of the polymer/carbon black/additive material by about 1%, 2%, 3%, 4%, 5%, 6%, 7%, 8%, 9%, 10%, or more, compared to a polymer/carbon black material that is otherwise identical but does not contain the performance-enhancing additive.

In some embodiments, the performance-enhancing additive increases 300% elongation modulus of the polymer/carbon black/additive material by about 1%, 2%, 3%, 4%, 5%, 6%, 7%, 8%, 9%, 10%, or more, compared to a polymer/carbon black material that is otherwise identical but does not contain the performance-enhancing additive.

In some embodiments, the performance-enhancing additive increases tear strength of the polymer/carbon black/additive material by about 1%, 2%, 3%, 4%, 5%, 6%, 7%, 8%, 9%, 10%, or more, compared to a polymer/carbon black material that is otherwise identical but does not contain the performance-enhancing additive.

In some embodiments, the performance-enhancing additive increases elongation of the polymer/carbon black/additive material by about 1%, 2%, 3%, 4%, 5%, 6%, 7%, 8%, 9%, 10%, or more, compared to a polymer/carbon black material that is otherwise identical but does not contain the performance-enhancing additive.

In some embodiments, the performance-enhancing additive enhances dispersion of the polymer/carbon black/additive material by about 1%, 2%, 3%, 4%, 5%, 6%, 7%, 8%, 9%, 10%, or more, compared to a polymer/carbon black material that is otherwise identical but does not contain the performance-enhancing additive.

In some embodiments, the performance-enhancing additive increases the Garlock mold flow parameter of the polymer/carbon black/additive material by about 1%, 2%, 3%, 4%, 5%, 6%, 7%, 8%, 9%, 10%, or more, compared to a polymer/carbon black material that is otherwise identical but does not contain the performance-enhancing additive.

In some embodiments, the performance-enhancing additive increases the maximum torque of the polymer/carbon black/additive material by about 1%, 2%, 3%, 4%, 5%, 6%, 7%, 8%, 9%, 10%, or more, compared to a polymer/carbon black material that is otherwise identical but does not contain the performance-enhancing additive.

In some embodiments, the performance-enhancing additive decreases the minimum torque of the polymer/carbon black/additive material by about 1%, 2%, 3%, 4%, 5%, 6%, 7%, 8%, 9%, 10%, or more, compared to a polymer/carbon black material that is otherwise identical but does not contain the performance-enhancing additive.

In certain methods, the amorphous silica is present as finely ground pumice. The performance-enhancing additive may be characterized by an average particle size selected from about 1 micron to about 10 microns, such as about 1, 2, 3, 4, 5, 6, 7, 8, 9, or 10 microns. Smaller or larger particles may be included as well.

The polymer within the material may be a natural or synthetic rubber, for example, or any other polymer or modified polymer suitable for combining with carbon black, along with the performance-enhancing additive.

In some methods, the performance-enhancing additive is added to the carbon black prior to dispersion of a mixture of the carbon black and the performance-enhancing additive into the polymer. In these or other embodiments, the performance-enhancing additive is added directly to the polymer, separately from dispersion of the carbon black into the polymer. For example, the carbon black may be added to the polymer, and then the performance-enhancing additive is added to the polymer. Alternatively, or additionally, the performance-enhancing additive may be added to the polymer, and then the carbon black is added to the polymer.

In preparing rubber compounds (and other polymer composites), plastic master batches or liquid dispersions require dispersing carbon black and other ingredients to the best possible level. The performance of the end product is almost always strongly dependent on the level of dispersion. In rubber, the dispersion will be influenced by the type of filler, type of polymer, filler loading, and the processing parameters, among many others. In plastics and in liquid dispersion systems, it is a preferred to first prepare the concentrated master batch that later is further diluted to the required carbon black loading level. This method of preparation takes advantage of the increased shear forces between additive fragments, leading to faster and more effective dispersion. In tire rubber compounds, better dispersion can be translated to better hysteresis of every tire component, improved traction, and optimized treadwear. In manufactured rubber goods, better dispersion almost always leads to better component performance and increased useful life of hoses, belts, seals, or other products.

Dispersion may be measured or characterized in a variety of ways. In some embodiments, for example, a Bruker Optical Profilometer is used to measure surface roughness. Lower Optical Profilometry numbers indicate better dispersion. Lower surface roughness (a length scale) as well as lower standard deviation of the surface roughness, indicate better dispersion. A surface-roughness parameter can be defined as the surface roughness in nanometers multiplied by its standard deviation, divided by 1000.

The surface-roughness parameter will generally depend on the selected polymer, the concentration of carbon black, the concentration and type of performance-enhancing additive, other components present, and the method of dispersion. In various embodiments, the surface-roughness parameter of a material including the performance-enhancing additive of the invention is less than about 1000, 900, 800, 700, 600, 500, 400, 300, 200, 100, 75, 50, 45, 40, 35, 30, 25, 20, 15, or 10. In some specific embodiments in which the polymer is a nitrile rubber, the final composition is characterized by a surface-roughness parameter of about 50 or less, such as about 25 or less.

Instrumentation and rubber testing technology have greatly improved the compounder's ability to understand what is happening with respect to carbon black dispersion. In some embodiments, a "rubber process analyzer" (e.g., Alpha Technologies, Akron, Ohio, U.S.) can measure polymer viscosity at various temperatures, frequencies, and shear rates.

Some variations of the invention provide a composition containing a carbon black and a performance-enhancing additive comprising amorphous silica, wherein the performance-enhancing additive causes a property improvement associated with the carbon black, compared to an otherwise-identical composition that does not contain the performance-enhancing additive. Such a composition may be added to or blended with a polymer, or with another material, such as an organic or inorganic chemical that is not a polymer.

Some variations of the invention provide a composition containing a performance-enhancing additive comprising amorphous silica, wherein the performance-enhancing additive is capable of improving a static or dynamic physical property of carbon black. The composition may be blended with carbon black to achieve the desired effect, and the mixture then added to an organic or inorganic polymer or an organic or inorganic non-polymer. Alternatively, or additionally, the composition may be blended directly with an organic or inorganic polymer or an organic or inorganic non-polymer, along with carbon black.

Some variations provide a composition for improving dispersion and/or tensile strength in a mixture comprising carbon black, the composition comprising pumice or a pumice-like material. In certain embodiments, the tensile strength is at least 10% higher compared to an otherwise-identical composition without the pumice or a pumice-like material.

The carbon black and performance-enhancing additive may be present in a rubber or other polymer formulation, for example. The carbon black and performance-enhancing additive may be present in an engineered polymer or composite formulation.

Some variations provide a composition comprising a polymer, carbon black, and pumice or a pumice-like material. In some embodiments, the polymer is a natural or synthetic rubber. The pumice or a pumice-like material is believed to scrub or exfoliate the carbon black in situ. The scrubbing or exfoliating of the carbon black causes an increase in tensile strength associated with, or imparted by, the carbon black.

Some variations also provide a method of improving dispersion and/or tensile strength in a mixture comprising carbon black, the method comprising introducing pumice or a pumice-like material to the mixture. The mixture may be a rubber or other polymer formulation, an engineered polymer, a composite formulation, or any other mixture or material containing carbon black.

More generally, some variations provide a composition containing a polymer, carbon black, and a performance-enhancing additive comprising pumice, a pumice-derived material (e.g., finely ground pumice), or a pumice-like material, wherein the performance-enhancing additive causes a property improvement associated with or imparted by the carbon black, compared to an otherwise-identical composition that does not contain the performance-enhancing additive. A "pumice-like material" in this context means physical similarity with pumice, but not necessarily chemical similarity. Silica need not be present in a pumice-like material.

A pumice-like material is highly porous. A typical porosity of pumice is 90%. A typical porosity range of a pumice-like material, in this disclosure, is regarded as about 50% to about 99%, such as about 75% to about 95%. The porosity can be present in many forms, such as open spaces or vesicles in the form of round bubbles, linear tubes, irregular cavities, open cells, or closed cells. Hierarchical porosity may be present, in which pores of different length scales make up the material. When the pumice-like material is milled or otherwise mechanically treated to produce finely ground particles, the porosity may be altered, typically (but not necessarily) being reduced.

Figure 2:
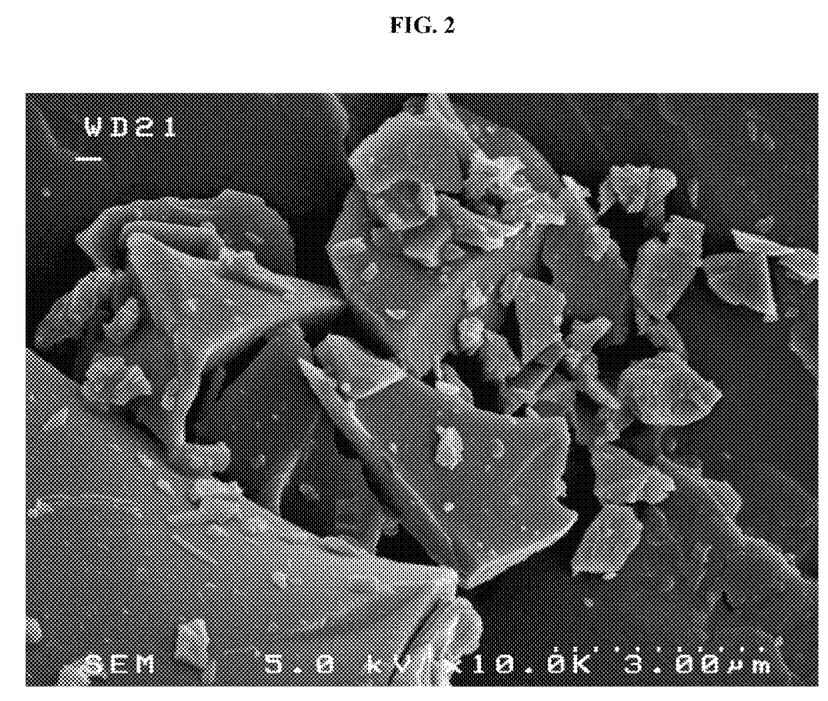
FIG. 2 is a depiction of finely ground pumice, which provides natural amorphous silica (NAS) for use in exemplary performance-enhancing additives.

A pumice-like material is also irregularly shaped (such as depicted in FIG. 2), especially when milled or otherwise mechanically treated to produce finely ground particles. Irregular shapes are anisotropic (directionally dependent), and geometrically asymmetric in one, two, or three dimensions. The particle shape may be random. In some embodiments, a ground pumice-like material provides platy particles. The term "platy" refers to particle aspect ratio, wherein a platier particle has a higher aspect ratio (plate-like). Platy particles may be naturally platy or may derive from layered structures that are separated mechanically.

Some embodiments of the invention provide a composition containing a polymer, carbon black, and an additive comprising amorphous silica, wherein the additive causes an increase in composition tensile strength associated with, or imparted by, the carbon black.

Some embodiments provide a method of improving tensile strength in a material containing a polymer and carbon black, the method comprising mixing an additive comprising amorphous silica into the material, wherein the additive causes an increase in composition tensile strength associated with, or imparted by, the carbon black. The tensile strength may be increased by 5%, 10%, or more, due to the additive. In certain embodiments, the polymer, the carbon black, and the functional additive are mixed together with a dispersion time of about 10 minutes or less.

The principles of the invention may be applied to many commercial products and systems, with an important example being tires. A "tire" as intended herein is a ring-shaped vehicle component that covers the wheel's rim to protect it and enable better vehicle performance. Most tires, such as those for automobiles and bicycles, provide traction between the vehicle and the road while providing a flexible cushion that absorbs shock. The materials of modern pneumatic tires are synthetic rubber, natural rubber, fabric and wire, along with carbon black and other chemical compounds. They consist of a tread and a body. The tread provides traction while the body provides containment for a quantity of compressed air. Today, most tires are pneumatic inflatable structures, comprising a doughnut-shaped body of cords and wires encased in rubber and generally filled with compressed air to form an inflatable cushion. Pneumatic tires are used on many types of vehicles, including cars, bicycles, motorcycles, trucks, earthmovers, and aircraft. Solid rubber (or other polymer) tires are still used in various non-automotive applications, such as casters, carts, lawnmowers, and wheelbarrows.

Natural rubber, or polyisoprene, is normally the basic elastomer used in tire making. Styrene-butadiene co-polymer (SBR) is a synthetic rubber which may be substituted in part for natural rubber based on the comparative raw materials cost. Polybutadiene is used in combination with other rubbers because of its low heat-buildup properties. Halobutyl rubber is used for the tubeless inner liner compounds, because of its low air permeability. Carbon black forms a high percentage of the rubber compound. This gives reinforcement and abrasion resistance.

The performance-enhancing additive may be incorporated into any of these tire components. The performance-enhancing additive of the invention may be present in one or more tire components selected from the group consisting of inner liner, body ply, sidewall, beads, apex, belts, treads, cushion gum, and textile fabric.

The inner liner is typically an extruded halobutyl rubber sheet compounded with additives that result in low air permeability. The inner liner assures that the tire will hold high-pressure air inside, without the air gradually diffusing through the rubber structure.

The body ply is a calendered sheet typically consisting of one layer of rubber, one layer of reinforcing fabric, and a second layer of rubber. Passenger tires typically have one or two body plies. Body plies give the tire structure strength. Truck tires, off-road tires, and aircraft tires have progressively more plies. The fabric cords are highly flexible but relatively inelastic.

Sidewalls are non-reinforced extruded profiles with additives (which could include the present performance-enhancing additives) to give the sides of the tire good abrasion resistance and environmental resistance. Additives used in sidewall compounds include antioxidants and antiozonants. Sidewall extrusions are nonsymmetrical and provide a thick rubber area to enable molding of raised letters. The sidewalls give the tire resistance against the environment.

Beads are typically bands of high tensile-strength steel wire encased in a rubber compound. Bead wire is coated with special alloys of bronze or brass. Coatings protect the steel from corrosion. Copper in the alloy and sulfur in the rubber cross-link to produce copper sulfide, which improves bonding of the bead to the rubber. Beads are inflexible and inelastic, and provide the mechanical strength to fit the tire to the wheel. Bead rubber includes additives to maximize strength and toughness The apex is a triangular extruded profile that mates against the bead. The apex provides a cushion between the rigid bead and the flexible inner liner and body ply assembly.

Belts are calendered sheets typically consisting of a layer of rubber, a layer of closely spaced steel cords, and a second layer of rubber. The steel cords are oriented radially in radial tire construction, and at opposing angles in bias tire construction. Belts give the tire strength and dent resistance while allowing it to remain flexible. Passenger tires are usually made with two or three belts.

The tread is a thick extruded profile that surrounds the tire carcass. Tread compounds include additives (which may include the disclosed performance-enhancing additives) to impart wear resistance and traction in addition to environmental resistance. Tread compound development is an exercise in compromise, as hard compounds have long wear characteristics but poor traction whereas soft compounds have good traction but poor wear characteristics.

Sulfur crosslinks the rubber molecules in the vulcanization process. Vulcanizing accelerators are complex organic compounds that speed up the vulcanization. Activators, such as zinc oxide, assist the vulcanization. Antioxidants and antiozonants prevent sidewall cracking due to the action of sunlight and ozone. Textile fabric reinforces the carcass of the tire.

The principles of the disclosure may be applied to various polymeric systems such as thermoset elastomers (examples include but are not limited to: halobutyl, butyl, EPDM, NBR, neoprenes, natural rubber, polybutadienes, styrene-butadiene, etc., either used alone or in blends); thermoplastics polymers (examples include but are not limited to: homopolymers or copolymers of polypropylene, polyethylene, polystyrene, ABS, PMMA, PVC, PVA, SBR, etc.); and thermoplastic vulcanizates which are polymeric blends of thermoset and thermoplastic polymers.

The principles of the disclosure may be applied to other carbon black formulations where certain properties, rather than mixing efficiencies, are required. An example is oilfield compounds which can have critical sealing and performance requirements.

Finally, the principles of the disclosure may be applied to carbon black itself, and to carbon-based composites incorporating the performance-enhancing additive.

EXAMPLES

The challenge of carbon black dispersion in a viscoelastic polymer matrix begins with dissimilar materials (rubber and fillers) being forced together under high shear, high temperatures, and high intermolecular pressure. Rubber compounders continually struggle to balance the overall dispersion quality and batch-to-batch consistency while at the same time reducing mixing time which increases mixer output and thus cost savings.

Figure 1:
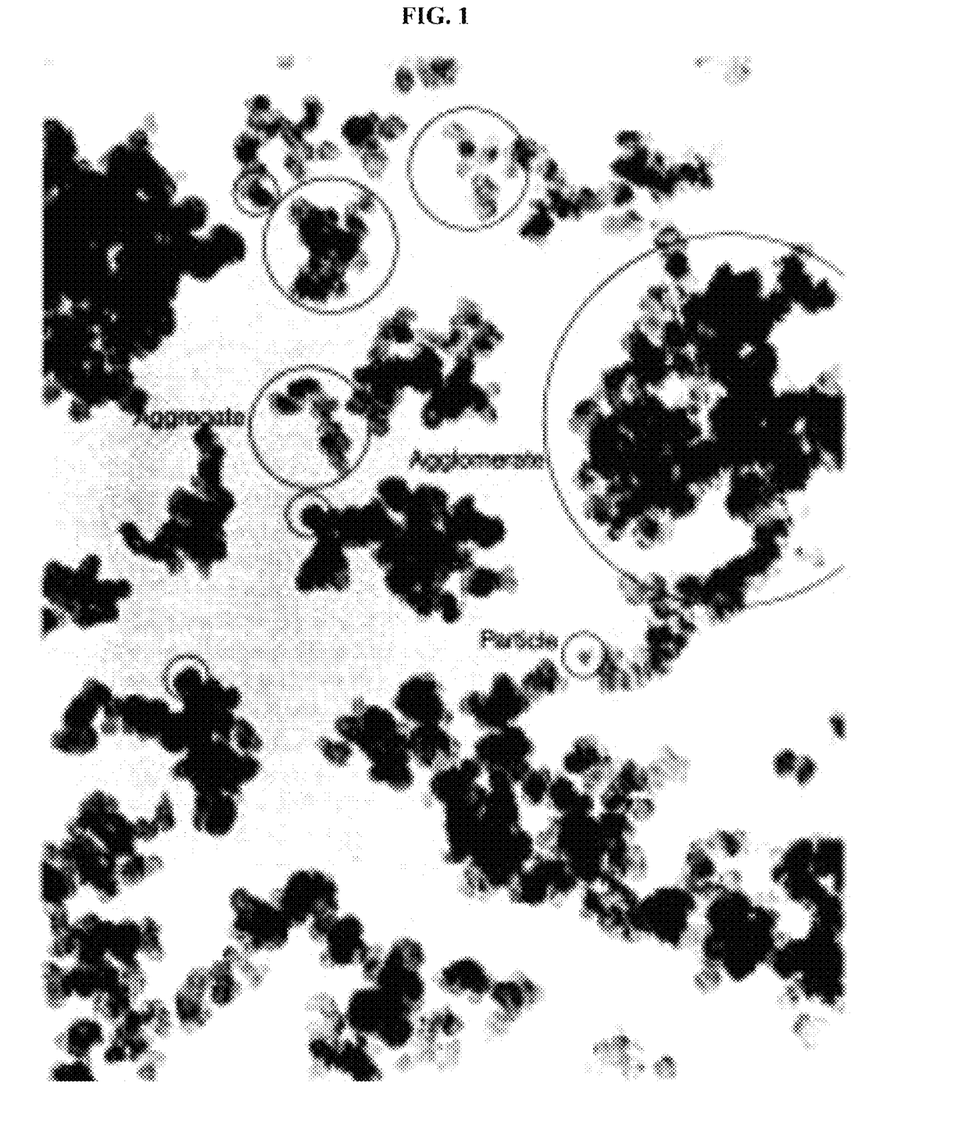
FIG. 1 is a depiction of carbon black morphology, in some embodiments.

An understanding of carbon black morphology is helpful as the dispersion process takes place. Reference is made to FIG. 1, which depicts carbon black morphology including various agglomerates, aggregates, and individual particles. Often it is assumed that if the carbon black is mixed in the rubber or encapsulated in the rubber, then all is well. This is not always the case. Depending on the degree of mixing, the resulting polymer viscosities and resulting physical properties may be very different.

Exemplary natural amorphous silica (NAS) is depicted in FIG. 2, which is specifically finely ground pumice in this example. A notably different shape and structure (compared to carbon black) is evident in the picture. It is theorized—without limiting the present invention—that the difference in particle size and shape is important in breaking apart the carbon agglomerates and aggregates in the carbon black dispersion process.

The presence of natural amorphous silica (here, as finely ground pumice) with carbon black in various ethylene-propylene-diene-monomer (EPDM) formulations was studied for potential enhancing" effects of the carbon black dispersion from aggregate to individual particles. The EPDM formulations were studied in a designed experimental matrix to evaluate pumice loading level, pumice particle size, and mixing time. The pumice was added in addition to the carbon black. Physical properties and dynamic properties were evaluated for an overall performance enhancement effect. An optimization case study was performed to demonstrate the usefulness of combining physical properties, dynamic properties, and business objectives to determine a best overall scenario for a given application.

Several EPDM synthetic rubber formulations were evaluated. Some formulations included a reinforcing material with about 70 phr carbon black to 100 phr polymer. Other formulations included carbon black levels of 200-400 phr to 100 phr polymer. These extremes are indicative of what the modern rubber formulators deal with on a regular basis.

A two-level, three-factor, full-factorial design was used to evaluate the effect of natural amorphous silica (NAS) on a conventional EPDM formulation. A total of eight batches were used for the data set. The EPDM formulation is as follows:

EPDM Rubber: 100 parts
Carbon Black N762: 70 parts
Process Oil: 20 parts
Natural amorphous silica (NAS): Add per design (see Table 1)
Antioxidant: 1 part
Peroxide: 5 parts
Total: Approximately 200 parts

TABLE 1

Design Matrix for the 8 Batches

| Run | NAS Type | NAS Loading | Mixing Time |
|---|---|---|---|
| 1 | 3 micron | 3 phr | 5 minutes |
| 2 | 3 micron | 3 phr | 7 minutes |
| 3 | 3 micron | 7 phr | 5 minutes |
| 4 | 3 micron | 7 phr | 7 minutes |
| 5 | 7 micron | 3 phr | 5 minutes |
| 6 | 7 micron | 3 phr | 7 minutes |
| 7 | 7 micron | 7 phr | 5 minutes |
| 8 | 7 micron | 7 phr | 7 minutes |

TABLE 2

Physical Properties of Control EPDM Formulation with No Added NAS

| Mixing Time | 5 min | 7 min |
|---|---|---|
| Tensile Strength | 2120 psi | 2240 psi |
| Elongation | 375% | 340% |
| 100% Modulus | 360 psi | 430 psi |
| 300% Modulus | 1520 psi | 1915 psi |
| Max. Torque (MH) | 12.85 ft-lbs | 13.73 ft-lbs |
| Min. Torque (ML) | 1.42 ft-lbs | 1.36 ft-lbs |
| Flow Parameter* | 5.5 | 5.5 |

*Flow Parameter measured by Garlock mold flow test

The three factors studied were: NAS Type (3 micron vs. 7 micron average particle size), NAS Loading Level (3 phr vs. 7 phr), and Mixing Time (5 minutes vs. 7 minutes). The design matrix is given in Table 1. Additional experiments were performed without any additional NAS, as a control. The results of the control formulations are given in Table 2.

The samples were mixed, molded, and tested per well-known ASTM procedures. The responses measured were: 1) tensile strength, 2) elongation %, 3) 100% modulus (i.e., modulus at 100% elongation), 4) 200% modulus (i.e., modulus at 200% elongation), 5) 300% modulus (i.e., modulus at 300% elongation), 6) hardness Shore A, 7) specific gravity, 8) tear strength, 9) maximum torque MH, 10) minimum torque ML, and 11) flow parameter as measured by Garlock mold flow. These physical properties can easily be maximized, minimized, and optimized according to application requirements.

Generally speaking, higher values of tensile strength, tear strength, and elongation are desired. Higher values of 100% modulus, 200% modulus, and 300% modulus are also desired. Higher maximum torque and lower minimum torque are beneficial for the process. Higher values of the Garlock mold flow parameter mean that the rubber flows better in the mold and fills voids. The samples were measured as having a hardness Shore A of about 65, which is a typical target.

Figure 3:
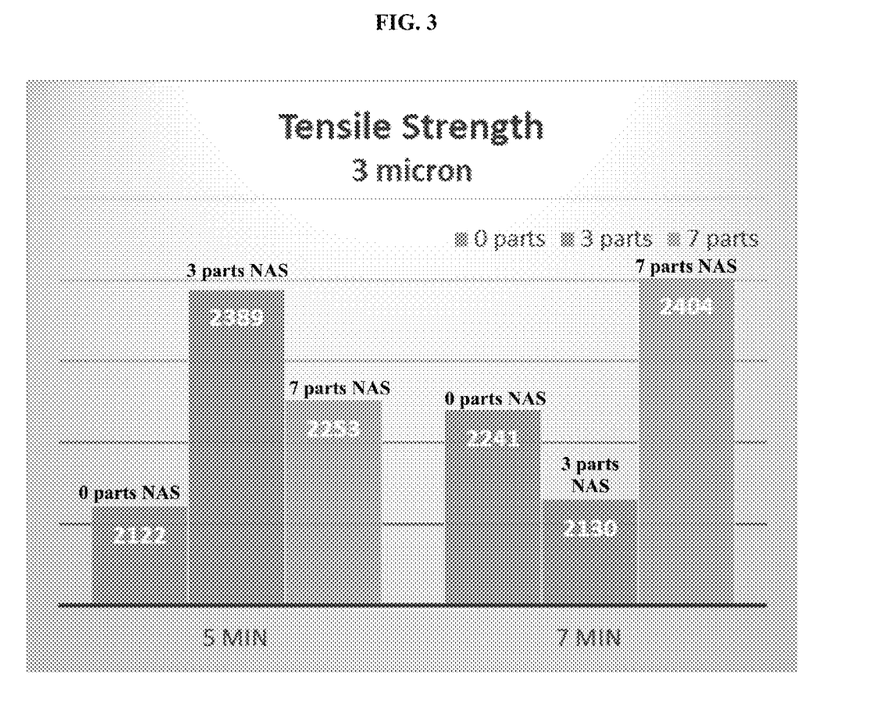
FIG. 3 is a graph of tensile strength (psi) versus NAS loading level (phr) for a 3 micron NAS particle size, in the Examples.
Figure 4:
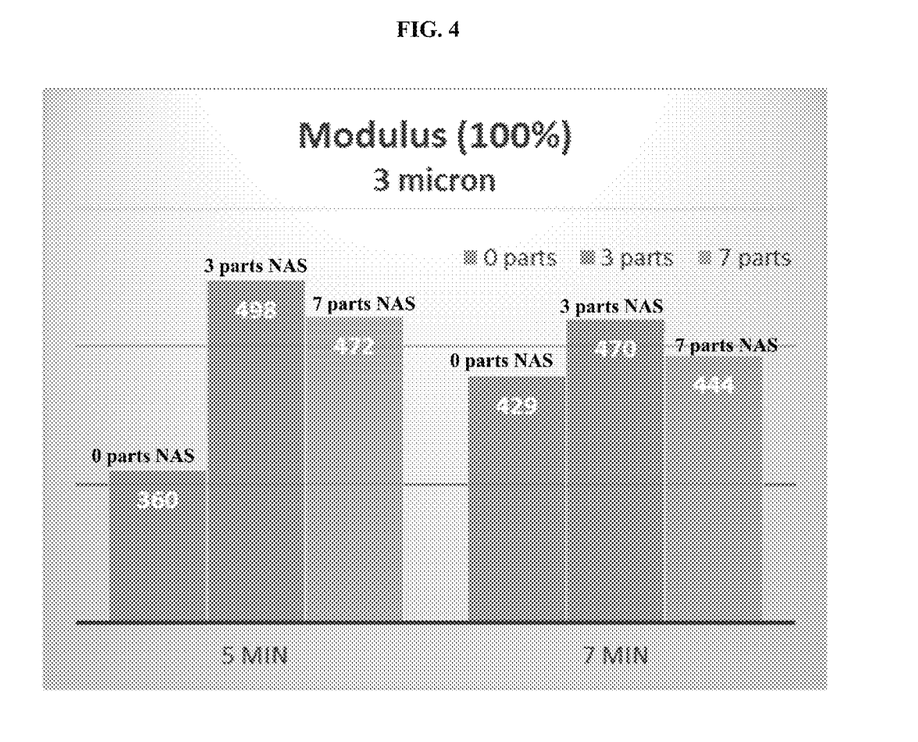
FIG. 4 is a graph of 100% modulus (psi) versus NAS loading level (phr) for a 3 micron particle size, in the Examples.

The results for the designed experiment are presented in two formats. First an example is given in a more classical representation. Tensile and 100% modulus are plotted vs. the loading level for the 3 micron particle size NAS, in FIGS. 3 and 4. Next a series of graphs (FIGS. 5 to 8) are given via the designed-experiment perspective, to illustrate the statistical effect of multiple factors at the same time. In all figures, strength and modulus are given in units of MPa.

Figure 5:
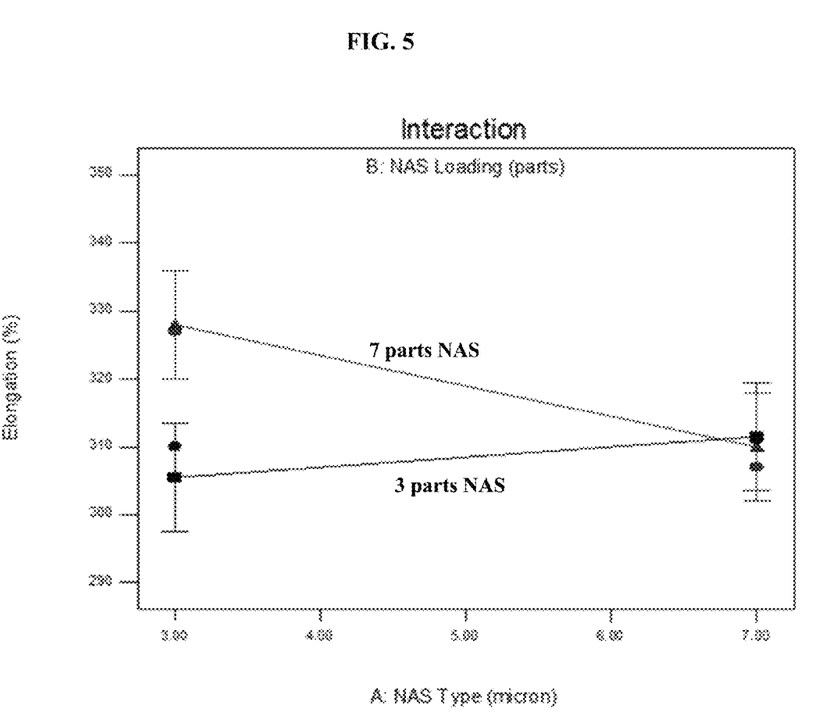
FIG. 5 is a plot of elongation (%) versus NAS type (particle size in microns) and NAS loading level (phr), in the Examples.
Figure 6:
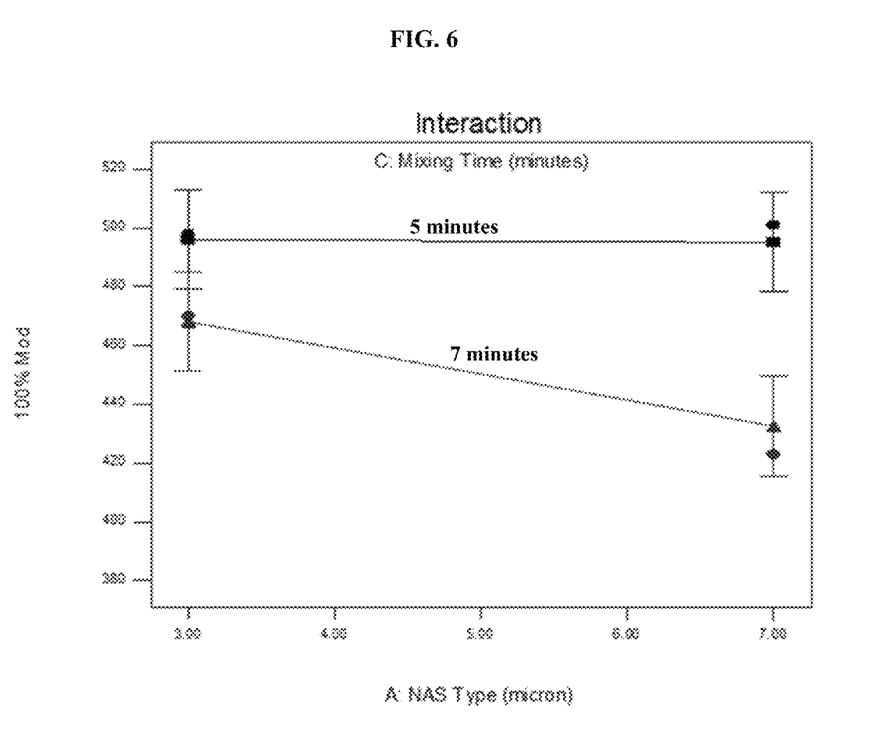
FIG. 6 is a plot of 100% modulus (psi) versus NAS type (particle size in microns) and mixing time (minutes), in the Examples.
Figure 7:
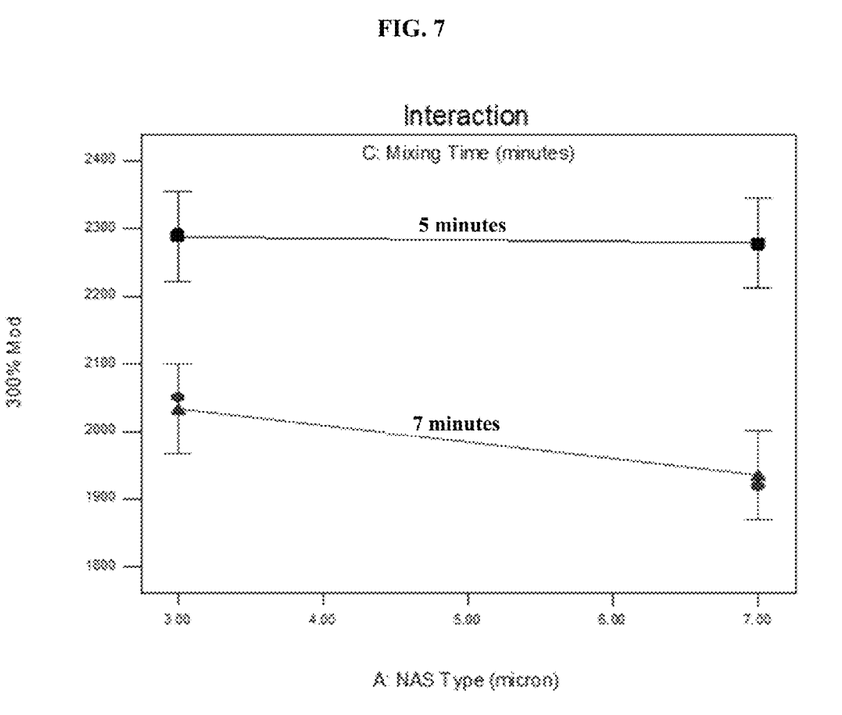
FIG. 7 is a plot of 300% modulus (psi) versus NAS type (particle size in microns) and mixing time (minutes), in the Examples.
Figure 8:
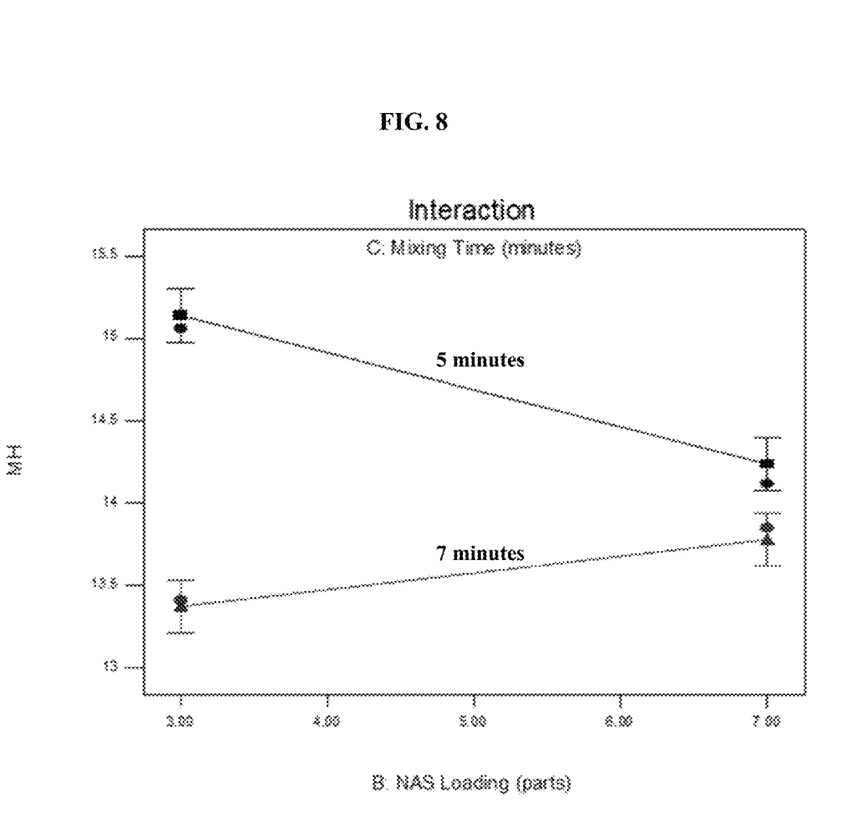
FIG. 8 is a plot of maximum torque (MH, ft-lbs) versus NAS loading (phr) and mixing time (minutes), in the Examples.

FIG. 5 illustrates elongation vs. NAS type and NAS loading level. To interpret this graph, the highest elongation is achieved with the 3 micron particle size and the high loading level of 7 phr. FIGS. 6 and 7 show the response of 100% modulus and 300% Modulus vs. NAS type and mixing time, respectively. Finally, FIG. 8 gives the MH (maximum torque) vs. NAS loading level and mixing time. In each of FIGS. 5-8, the response is given versus the statistically significant factors.

The resulting statistical models may then be utilized in various mathematical optimizations. These optimizations can balance properties with conditions and inputs, such as mixing time, which can be correlated to operating costs. As an example, for the 3 micron particle size, the best loading level is 4.2 phr and the optimum mixing time is 5.5 minutes. Similarly, for the 7 micron particle size, the best loading level is 3.0 phr and the optimum mixing time is 5.6 minutes.

Several roofing grade formulations were also evaluated. The impact of added NAS at 0 (control), 2, 4, and 6 phr was evaluated for carcass grade carbon blacks and for tread grade carbon blacks. Multiple tire formulations were evaluated. The impact of the NAS on the resulting physical properties was significant. Furthermore, these studies showed that the best performance (in terms of 100% modulus, 200% modulus, and 300% modulus) was at 4 phr for the carcass grade carbon blacks and at 6 phr for the tread grade carbon blacks, within the 0-6 phr NAS range tested.

The data set is statistically significant. The NAS type and loading level have an impact on the performance results. An exemplary optimization routine suggests that lower to mid load levels for both 3 and 7 micron NAS particles, at intermediate mix times, give a good balance of all the measured properties.

Overall, the experimental evidence supports the discovery that small amounts of natural amorphous silica added to carbon black—based formulations enhance the dispersion mechanism. In particular, increased modulus values indicate enhanced dispersion. The enhanced dispersion can be used to reduce operational mixing times to achieve a desired dispersion with resulting physical properties in an optimal mixing time which is much more cost-effective. The designed experimental matrix and the resulting mathematical models can be used and reused based on application criteria to yield the best solution for a given application.

Business implications of the present invention include a reduction in the cost of goods sold, larger savings in reduced mixing times, additional capacity with no additional capital costs, and operational efficiencies All publications, patents, and patent applications cited in this specification are incorporated herein by reference in their entirety as if each publication, patent, or patent application was specifically and individually put forth herein.

In this detailed description, reference has been made to multiple embodiments of the disclosure and non-limiting examples relating to how the disclosure can be understood and practiced. Other embodiments that do not provide all of the features and advantages set forth herein may be utilized, without departing from the spirit and scope of the present disclosure. This disclosure incorporates routine experimentation and optimization of the methods and systems described herein. Such modifications and variations are considered to be within the scope of the invention defined by the claims.

Where methods and steps described above indicate certain events occurring in certain order, those of ordinary skill in the art will recognize that the ordering of certain steps may be modified and that such modifications are in accordance with the variations of the disclosure. Additionally, certain of the steps may be performed concurrently in a parallel process when possible, as well as performed sequentially.

Therefore, to the extent that there are variations of the disclosure, which are within the spirit of the disclosure or equivalents of the appended claims, it is the intent that this patent will cover those variations as well. The present disclosure shall only be limited by what is claimed.

What is claimed is:

1. A composition containing a polymer, carbon black, and a performance-enhancing additive comprising amorphous silica, wherein said amorphous silica is about 50 wt % to about 99 wt % of said performance-enhancing additive, and wherein said amorphous silica is present in said composition at a concentration from about 0.1 wt % to about 10 wt %, wherein said performance-enhancing additive causes a property improvement associated with or imparted by said carbon black, compared to an otherwise-identical composition that does not contain said performance-enhancing additive, and wherein said property is selected from static physical properties, dynamic physical properties, dispersion, and combinations thereof.

2. The composition of claim 1, wherein said performance-enhancing additive scrubs or exfoliates said carbon black in situ.

3. The composition of claim 1, wherein said amorphous silica is present in said composition at a concentration from about 0.5 wt % to about 5 wt %.

4. The composition of claim 1, wherein said amorphous silica is derived from a material selected from the group consisting of pumice, perlite, another natural volcanic material with a similar morphology to pumice or perlite, and combinations thereof.

5. The composition of claim 1, wherein said performance-enhancing additive is derived from an irregularly shaped, porous material.

6. The composition of claim 5, wherein said irregularly shaped, porous material is a synthetic ceramic material.

7. The composition of claim 4, wherein said amorphous silica is present as finely ground pumice.

8. The composition of claim 7, wherein said performance-enhancing additive consists essentially of said finely ground pumice.

9. The composition of claim 1, wherein said performance-enhancing additive is characterized by an average particle size selected from about 1 micron to about 10 microns.

10. The composition of claim 9, wherein said average particle size is selected from about 3 microns to about 7 microns.

11. The composition of claim 1, wherein said performance-enhancing additive contains less than 1 wt % of particles that are less than 1 micron in particle size.

12. The composition of claim 1, said performance-enhancing additive further comprising one or more materials selected from the group consisting of kaolin, talc, and mica.

13. The composition of claim 1, wherein said property is selected from the group consisting of tensile strength, modulus, tear, elongation, dispersion, flow properties, viscosity, hardness, specific gravity, rebound, torque, load, and combinations thereof.

14. The composition of claim 1, wherein said polymer is a natural or synthetic rubber.

* * * * *